Jan. 5, 1965 R. C. WHITMAN ETAL 3,164,114
CLAMP FOR SPACING AND HOLDING TUBE ENDS IN A BUTT
WELDING OPERATION WITH MEANS FOR POSITIONING
BACKING RINGS DEPENDING FROM THE CLAMP
Filed June 12, 1962
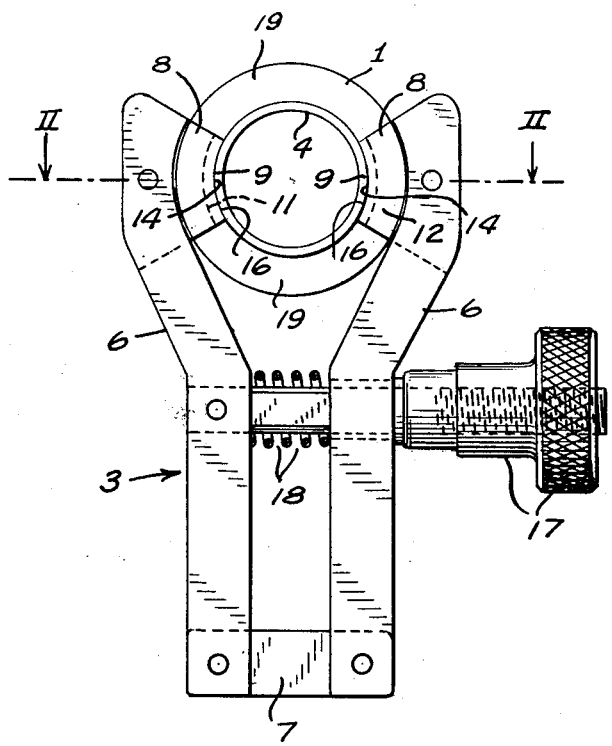
FIG. I.
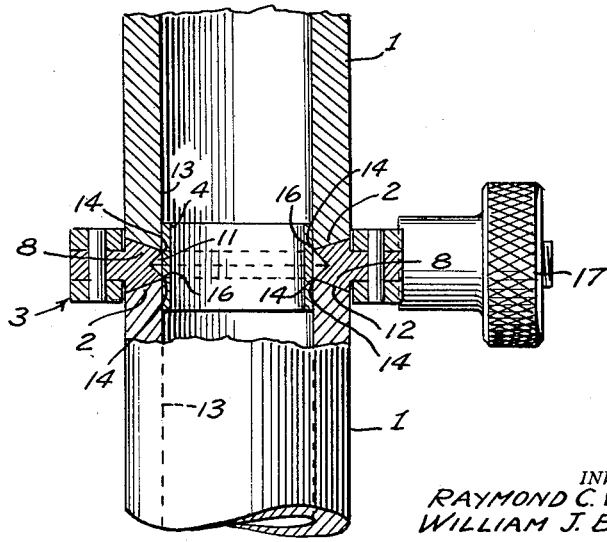
FIG. II.
INVENTORS
RAYMOND C. WHITMAN
WILLIAM J. BOWLES
BY *Charles E. Boxley*
ATTORNEY

United States Patent Office 3,164,114
Patented Jan. 5, 1965

3,164,114
CLAMP FOR SPACING AND HOLDING TUBE ENDS IN A BUTT WELDING OPERATION WITH MEANS FOR POSITIONING BACKING RINGS DEPENDING FROM THE CLAMP
Raymond C. Whitman, Wayland, and William J. Bowles, Hornell, N.Y., assignors to Foster Wheeler Corporation, New York, N.Y., a corporation of New York
Filed June 12, 1962, Ser. No. 201,948
4 Claims. (Cl. 113—102)

This invention relates to butt welding tubes end to end. More particularly, the invention is a tube spacing clamp which also supports a backing ring inward of the tube ends.

In many end to end tube welding applications, solid backing rings are required for weld uniformity and confining the weld to desired dimensions. Knock-off pins depending from the backing rings are used commercially to position the rings during tack welding. The pins are then knocked off with chisels and the butt weld is completed. Knock-off pins have served effectively in this capacity but they are expensive to fabricate.

The present advance accomplishes backing ring positioning by a novel and facile arrangement. It is here contemplated to grip backing rings via the gap between tube ends. Clamps are often used for spacing and holding tube ends during tack welding. These clamps are well suited to supporting grips for backing rings.

Basically, this teaching obviates the need for knock-off pins or lands depending from backing rings.

This device is reusable, so refined design is practical. Thus improved gripping of the backing rings is attained.

The steps of knocking off pins is eliminated with a consequent saving of time. Further the jeopardy of accidental damage is also reduced.

These and other advantages will appear more fully from the accompanying drawings wherein:

FIGURE I is a side view of the clamp depicted in FIGURE II.

FIGURE II is a sectional view through a pair of tubes positioned for end to end welding in a clamp which embodies the present invention.

In the drawing, tubes 1 are disposed in end to end coaxial alignment. Tube ends 2 are held by a clamp generally designated 3 for tack welding. After tack welding the clamp is removed and the butt weld is completed. Welding is accomplished from the outside with cylindrical backing ring 4 providing inward closure for the weld pool.

Clamp 3 includes bifurcated legs 6 pin connected to hip member 7. Holding members 8 are supported by legs 6 and have arcuate surfaces 9 to engage tube ends 2. Thus holding members 8 are adapted to restrain tubes 1 in axially aligned relationship.

Tube ends 2 are spaced apart to define gap 11 therebetween. Butt welding from the outside is facilitated by outward beveled tube ends, so wedges 12 are very suitable for engagement between tube ends 2 to develop gap 11.

The crux of the present invention is to position backing ring 4 via gap 11. Toward this objective wedges 12 project inward of inner tube walls 13 to define grips 14 having arcuate edges 16 adapted to penetrate gap 11 radially relative tubes 1 to circumferentially grip the backing ring.

Holding members 8 with wedges 12 and grips 14 are biased radially relative to tubes 1 by thumb nut 17 and opposing spring 18.

The tubes are tack welded about the circumference of the tube ends between holding members 8 along arcs 19 as best seen in FIGURE I.

It is contemplated that a manner of using the clamp will include the steps of disposing a backing ring between the jaws or legs 6 rotating nut 17 to draw the jaws together until grips 14 of wedges 12 firmly clamp on the backing ring 4. Thereafter, the tubes to be butt welded together are arranged with the ends thereof slipped over the backing ring and in abutment against opposed arcuate sides of the wedges 12, the latter defining the root gap between the tube ends. A welding tool is then used to tack weld the ends of the tubes and the backing ring together after which the holding clamp is removed by turning nut 17 to allow the spring 18 to spread the legs 6 apart releasing the backing ring. The tubes are thereafter finally welded together.

It will be apparent that wide changes may be made in the shown embodiment without departing from the spirit of invention defined by the claims.

What is claimed is:

1. A clamp for use in welding a pair of tube ends disposed in end to end coaxial alignment and having a cylindrical backing ring disposed inward thereof in telescoping alignment with the tube ends,
the clamp comprising a plurality of holding members,
wedge means depending from each of said holding members including a surface adapted to engage the external surface of the backing ring,
means arranged to position said holding members on approximately opposite sides of the backing ring so that said wedge means firmly grip the backing ring, the wedge means penetrating the gap between the tube ends radially relative to the tube ends,
said wedge means further including arcuate surfaces arranged to engage the end surfaces of the tube ends when the latter are brought into telescoping alignment with the backing ring to define the root gap between the tube ends, the backing rings masking the gap between the tube ends.

2. A clamp for use in welding a pair of tube ends disposed in end to end coaxial alignment and having a cylindrical backing ring disposed inward thereof in telescoping alignment with the tube ends,
the clamp comprising a plurality of holding members,
wedge means depending from each of said holding members including an arcuate gripping surface adapted to engage the external surface of the backing ring,
means arranged to position said holding members circumferentially about the backing ring so that said wedge means firmly grip the backing ring, the wedge means penetrating the gap between the tube ends radially relative to the tube ends,
said wedge means further including arcuate sides arranged to engage the end surfaces of the tube ends when the latter are brought into telescoping alignment with the backing ring to define the root gap between the tube ends, the backing ring masking the gap between the tube ends.

3. A clamp for use in welding a pair of tube ends disposed in end to end coaxial alignment and having a cylindrical backing ring disposed inward thereof in telescoping alignment with the tube ends,
the clamp comprising two holding members,
wedge means depending from each of said holding members including arcuate gripping surfaces adapted for circumferential engagement with the backing ring,
means for positioning the holding members at approximately opposite areas circumferentially about the backing ring,
said wedge means describing arcs of sufficient length to permit firm gripping of the backing ring by the opposed wedge means but at the same time providing spacing for tack welding of the tube ends to the backing ring, said wedge means depending from the holding members so as to penetrate the gap between the tube ends radially relative to the tube ends, said wedge means further including arcuate sides approximately coextensive with said arcuate gripping surfaces arranged to engage the end surfaces of the tube ends when the latter are brought into telescoping alignment with the backing ring to define the root gap between the tube ends, the backing ring masking the gap between the tube ends.

4. A clamp in accordance with claim 3 wherein the end surfaces of the tube ends are beveled outwardly the gap between the tube ends being narrowest along the inner edges thereof, said wedge sides which engage the end surfaces having slopes complementary with the tube beveled ends.

References Cited by the Examiner
UNITED STATES PATENTS

| | | | |
|---|---|---|---|
| 1,851,563 | 3/32 | Chapman | 113—136 |
| 1,969,572 | 8/34 | Maurer | 113—102 |
| 2,433,172 | 12/47 | Tipton | 113—102 |
| 2,887,918 | 5/59 | Benson | 113—102 X |

CHARLES W. LANHAM, *Primary Examiner.*

JOHN F. CAMPBELL, *Examiner.*